T. S. Jamieson,
Steam-Engine Valve-Gear.
Nº 19,640. Patented Mar. 16, 1858
Fig. 1.
Fig. 2.
Fig. 3.
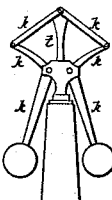
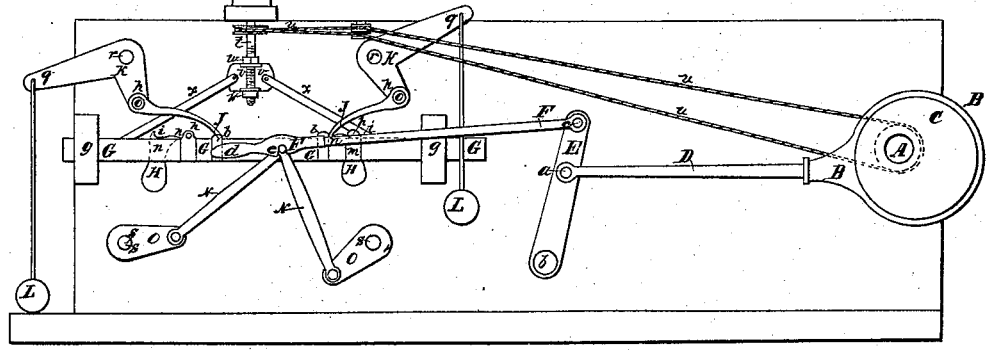
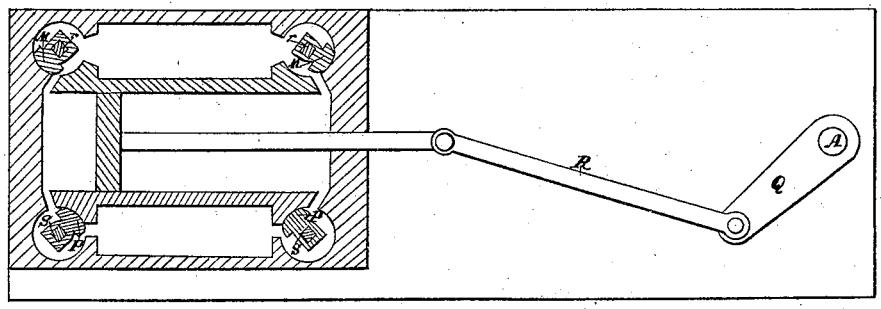
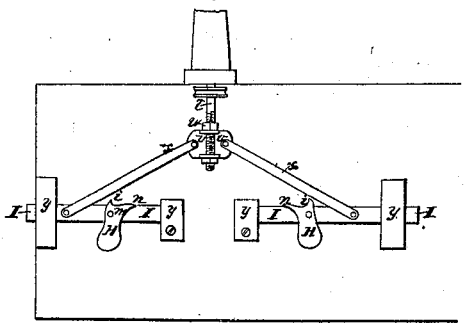

UNITED STATES PATENT OFFICE.

THOMAS S. JAMIESON, OF ALEXANDRIA, VIRGINIA.

IMPROVED MODE OF OPERATING VALVES IN STEAM-ENGINES.

Specification forming part of Letters Patent No. 19,640, dated March 16, 1858.

*To all whom it may concern:*

Be it known that I, THOMAS S. JAMIESON, of the city and county of Alexandria, and State of Virginia, have invented certain new and useful Improvements in Operating the Valves of Steam-Engines; and I do hereby declare the following to be a full, clear, and exact description of the construction and operation of the same, reference being had to the accompanying drawings, making a part of this specification, in which—

Figure 1 represents an elevation of the several parts for operating the valves with their connections to the eccentric and governor. Fig. 2 represents the valves with their inlet and exit ports. Fig. 3 represents the parts more immediately connected to the governor, and which are partially concealed in Fig. 1 by the parts in front of it.

Similar letters of reference, where they occur in the several figures, denote like parts of the apparatus in all of them.

My invention consists in the arrangement of the parts by which the valves are operated, so that the steam may be cut off at any desired point in the stroke of the engine, said parts being actuated by the governor, but so arranged as not to affect the governor except at the moment of tripping the valves, and then only in a very small degree, which makes the action of the governor more sensitive than by the devices heretofore used for this purpose.

To enable others skilled in the art to make and use my invention, I will proceed to describe the same with reference to the drawings.

A represents a shaft, to which is connected the eccentric C, which turns in a yoke B. A rod D extends from this yoke and is connected to a wrist-pin $a$ on the arm E, that is pivoted at $b$. To a wrist-pin $c$, at or near the top of this arm E, is attached one end of a connecting-rod or hand-lever F, the other end of said hand-bar being furnished with a handle $d$, and near thereto a depression $e$, that sets over a pin or stud $f$, that is attached to the sliding bar G, said sliding bar moving through guides $g\ g$. On this sliding bar G are two adjustable dogs or pins $h\ h$, which are carried back and forth as the bar reciprocates through its guides and which operate against the projections $i\ i$ of the swinging weighted dogs H H, said swinging dogs being attached to blocks or slides I I, (better seen in Fig. 3,) that move forward and back alongside of and parallel with the sliding bar G, by the action of the governor $k$, to which they are attached.

$l\ l$ are hooks or stops on the sliding bar G. The swinging dogs H H, when moved toward their respective hooks or stops $l\ l$, are met by the pins $h\ h$, which strike against the projections $i\ i$, and are thus caused to turn or rock on their pivoted points $m\ m$ until said projections are pressed down in a line with the upper edge of the bar G, and the point or toe $n$ of the swinging dog passes under the pawl J, and raising it up throws it out of the hook or stop $l$. The pawls J J are pivoted at $o\ o$ to one of the arms $p$, respectively, of the two-armed levers K K, and to the other arms $q$ of said levers are attached weights L L, for returning said levers to their former position after having been rocked with their shafts $r$ by the catch $l$ and pawl J, as above described, and the steam is thus cut off, as will be hereinafter mentioned. The weights L may work in a dash-pot or in any other well-known manner to prevent the valves from slamming.

On the shafts $r\ r$, that the levers K K are connected to, are also secured the valves M M, (as seen in Fig. 2,) said valves oscillating past the inlet and exit openings leading from the steam-chest to the cylinder and to the escape, for the purpose of cutting off the steam and opening the escape in the ordinary well-known way.

To the sliding bar G, by the pin or stud $f$ or otherwise, are attached the upper ends of the connecting rods or bars N N, the lower ends of said bars or rods being attached to the cranks or arms O O respectively. These cranks or arms O O are on the same shafts $s\ s$ on which the valves P P are placed, said valves P being on the opposite side of the cylinder from the aforedescribed ones M M, and acting like and in concert with the latter. Any other valves than those shown, whether flat or otherwise, may be used instead of the turning ones.

The stem $t$ of the governor may be rotated by an endless belt or band $u$, passing around a pulley thereon and another pulley on the shaft A; and the cross-head $v$ may be adjusted on said stem $t$ by the screw-nuts $w\ w$. To this cross-head $v$ are connected the upper ends of the rods $x\ x$, said rods extending from thence to the bars I I, which carry the swinging dogs H H, and which bars I move through proper guides $y\ y$. By means of these rods $x\ x$, whether by the adjustment of the cross-head $v$ or by the centrifugal force of the balls of the governor, the slides I, with their respective dogs H, are brought nearer to or farther from each other, and thus the valves are tripped at any point in the stroke cf the engine that may be desirable.

In Fig. 2, Q represents the crank on the shaft A, to which the connecting-rod R is attached.

It will be observed, and it is a distinguishing feature in the arrangement herein described, that there is no friction on the governor except at the moment of the tripping of the pawls J, and then it is so slight, being merely to depress the end of the swinging dog, that the governor is not affected in its regular motion thereby, as it would be were any of the parts bearing or resting upon it; and besides what resistance I do apply against the governor is merely to swing the hanging dog on its pivot, not to slide or move anything from one point or position to another, but simply to pendulate the dogs H. This allows the governor to move at a uniform velocity, and of course the tripping of the valves is correspondingly uniform, which is not the case where the governor has other work to do, as it has when connected to the valve apparatus.

Having thus fully described the nature and object of my invention, what I claim therein as new, and desire to secure by Letters Patent, is—

In combination with the sliding bar G and its several appliances, as herein described, operated directly from the engine, the swinging dogs H H, which are moved and adjusted by the governor, substantially as described, and for the purpose of tripping the valves at any desired stroke of the engine.

T. S. JAMIESON.

Witnesses:
A. B. STOUGHTON,
THOS. H. UPPERMAN.